United States Patent [19]
Zhou

[11] Patent Number: 5,552,023
[45] Date of Patent: Sep. 3, 1996

[54] RECOVERY OF SPENT DEICING FLUID

[75] Inventor: Shaojun J. Zhou, Palatine, Ill.

[73] Assignee: AlliedSignal Inc., Morris Township, Morris County, N.J.

[21] Appl. No.: 167,671

[22] Filed: Dec. 15, 1993

[51] Int. Cl.$^6$ ...................................................... B01D 3/00
[52] U.S. Cl. .................................. 203/18; 159/DIG. 27; 203/86; 203/DIG. 16; 210/500.27; 210/640; 210/500.38; 568/868
[58] Field of Search .............................. 203/86, 18, 49, 203/DIG. 16; 159/DIG. 27, DIG. 15; 210/500.38, 500.27, 640; 568/868

[56] References Cited

U.S. PATENT DOCUMENTS

| | | | |
|---|---|---|---|
| 3,953,566 | 4/1976 | Gore | 264/288 |
| 4,080,247 | 3/1978 | Malakul | 159/17 |
| 4,545,862 | 10/1985 | Gore et al. | 203/10 |
| 4,746,437 | 5/1988 | Koseki et al. | 203/DIG. 17 |
| 4,774,001 | 9/1988 | Degen et al. | 210/500.27 |
| 4,778,569 | 10/1988 | Ostertag | 159/DIG. 28 |
| 4,875,980 | 10/1989 | Arita et al. | 203/19 |
| 4,933,198 | 6/1990 | Lee et al. | 426/493 |
| 4,952,318 | 8/1990 | Pasternak et al. | 203/18 |
| 4,978,430 | 12/1990 | Nakagawa et al. | 203/18 |
| 5,034,134 | 7/1991 | George et al. | 210/651 |
| 5,091,081 | 2/1992 | Hilgren | 210/195.2 |
| 5,162,081 | 1/1992 | Bowes | 203/2 |
| 5,182,022 | 1/1993 | Pasternak et al. | 159/DIG. 27 |
| 5,194,159 | 3/1993 | George et al. | 210/500.41 |
| 5,232,085 | 8/1993 | Hayashi et al. | 159/DIG. 27 |
| 5,294,345 | 3/1994 | Kaschemekat | 210/640 |
| 5,300,197 | 4/1994 | Mitani et al. | 203/10 |

FOREIGN PATENT DOCUMENTS

| | | | |
|---|---|---|---|
| 2152502 | 7/1987 | Japan | 203/18 |
| 0564870 | 7/1977 | U.S.S.R. | 203/19 |

OTHER PUBLICATIONS

Anderson et al. "Design and Field Tests of a New Membrane Distillation Desalination Process" Desalination, 56 (1985) 345–354.

Primary Examiner—Virginia Manoharan
Attorney, Agent, or Firm—Harold N. Wells; Roger H. Criss

[57] ABSTRACT

Recovery of ethylene glycol from dilute aqueous solutions is accomplished by passing the solution over the surface of a porous hydrophobic membrane capable of passing water vapor but not liquid water. The pressure and temperature provide a positive driving force for the movement of water vapor through the membrane to the opposite face where it is removed by condensation or a stream of gas or liquid. Preliminary concentration of the aqueous solutions may be provided by use of reverse osmosis membrane. The method is useful in the reclamation of spent deicing fluid.

16 Claims, 1 Drawing Sheet

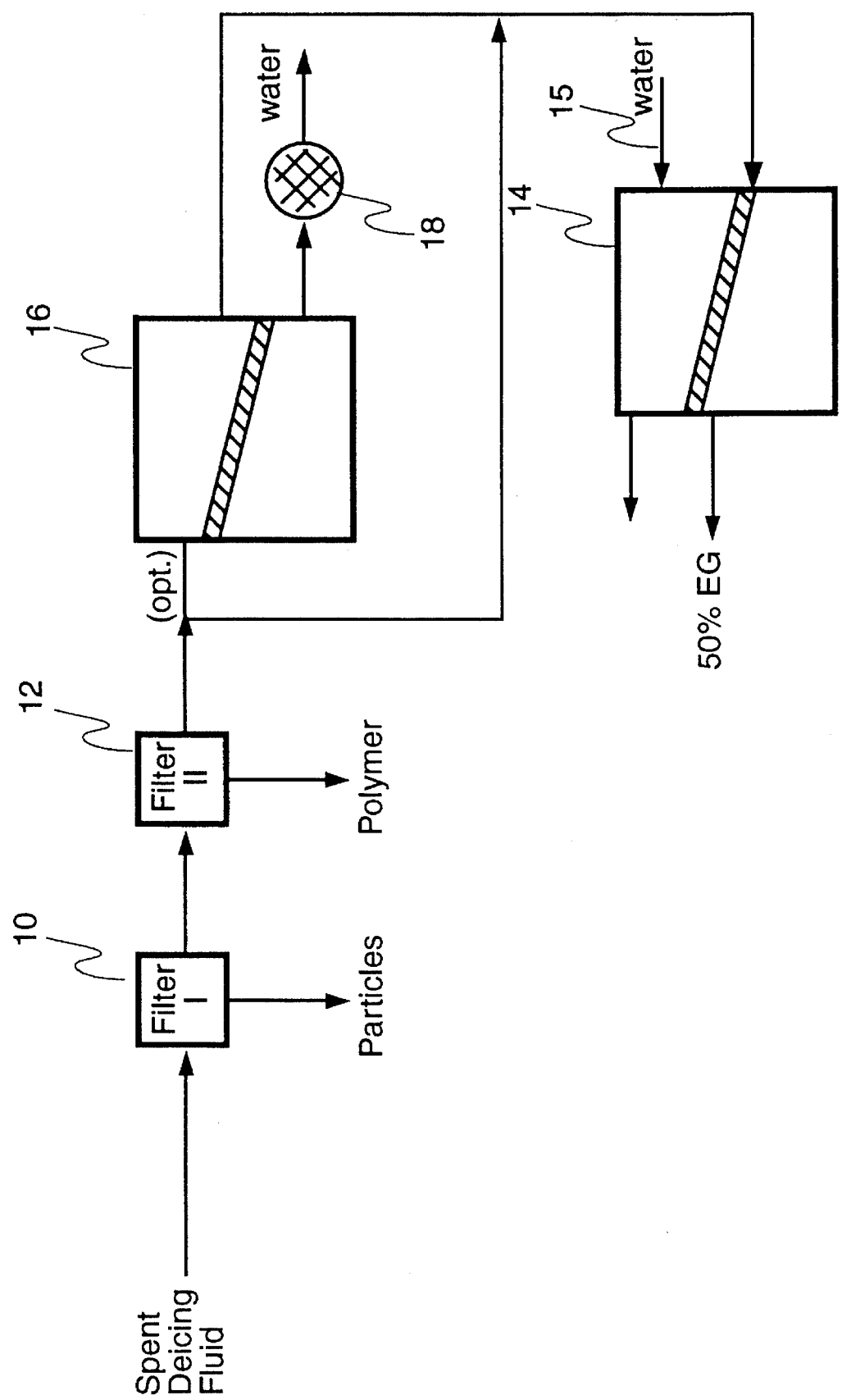

RECOVERY OF SPENT DEICING FLUID

The invention relates generally to the concentration of glycols such as ethylene glycol and propylene glycol in dilute water solutions. More particularly, the invention relates to the reclamation of deicing fluids used to remove the accumulation of ice and snow from the surfaces of aircraft and runways.

The use of ethylene glycol as antifreeze in automotive cooling systems is well known. Periodically, such systems are drained and recharged with fresh ethylene glycol solution. The drained fluid is typically about 30–50 vol. % ethylene glycol and is contaminated with solid particles and accumulated byproducts of the degradation of ethylene glycol and the additives used for corrosion protection, anti-foams and the like. A number of schemes have been proposed to reclaim ethylene glycol so that it can be reused. Some of these will be mentioned below, but typically they involve filtration to remove particulates and evaporation of the water content of the antifreeze solution.

A related but different problem was addressed by the present inventor—namely the recovery of glycols from spent deicing fluid. Such fluids are sprayed on the surfaces of aircraft and runways and they will therefore accumulate in drainage water from airports and can be a significant source of contamination during the winter months. The fluids typically contain ethylene glycol or propylene glycol, along with small amounts of additives as needed to meet the requirements of the specification for such fluids.

The recovery from deicing fluid of its ethylene glycol content is the subject of U.S. Pat. No. 4,080,247. The inventor discloses the concentration of ethylene glycol by a two-stage multi-effect evaporation system which is said to be capable of producing essentially pure ethylene glycol, although concentrations in the range of 40–52 vol. % are said to be suitable for use in aircraft deicing. Particulate matter is removed by filtration and contaminants in the water which has been evaporated are treated with a carbon absorber.

Other patents which have been concerned with the reclamation of ethylene glycol from spent automotive coolants typically involve evaporation of the water and filtration to remove particulates. Examples include U.S. Pat. No. 5,091,081 in which ultrafiltration is used to separate fine contaminants larger than about 25 microns in size. Both the water and ethylene glycol pass through the filter in this device so that a concentration effect is not obtained.

In U.S. Pat. No. 5,162,081 water and ethylene glycol are separated by distillation. The water is removed first and then the pressure is reduced and ethylene glycol is distilled over. Thus, a separation into relatively pure water and ethylene glycol is made. The contaminants are heavier and are left behind in the residue, which is then drained off for disposal.

The present inventor has found an improved method of recovering ethylene and propylene glycols which have been contaminated and diluted, particularly spent deicing fluid, but which may be applied also to waste coolants if desired.

SUMMARY OF THE INVENTION

The invention includes a method and apparatus for the concentration of glycols in dilute aqueous streams, particularly from fluid which has been used for deicing of aircraft. The method comprises passing the aqueous glycol solution over the surface of a porous hydrophobic membrane having 0.01 to 2.0 μm pores which is capable of passing water vapor but not liquid water. By maintaining the pressure below the pressure at which liquid water would be passed, water vapor can be passed through the membrane preferentially, provided also that the conditions on the opposite face of the membrane establish a positive driving force for the movement of water vapor. Typically, this is done by using a temperature for the aqueous glycol stream which is below the boiling temperature but is high enough to provide a substantial water vapor pressure, preferably about 40° C. to 80° C. The temperature on the opposite face of the membrane will be about 5° C. to 40° C. The water which passes through the membrane is removed continually to maintain the needed driving force for water vapor movement. Preferably, a stream of a gas such as air, or a stream of liquid is used to remove the water vapor. More preferably the water vapor is condensed by contact with a recirculating stream of water.

In one embodiment the separation process described above is preceded by a preliminary concentration step in which the aqueous ethylene glycol solution is first passed across the face of a reverse osmosis membrane capable of passing water but excluding glycol. After this step, the concentrated solution is further concentrated by the membrane evaporation process described above.

The concentration steps described make it possible to raise the concentration of the solution from about 1–10 wt. % glycol to about 50–80 wt. %. Particulate matter can be removed by a preliminary filtration step upstream of the membrane processes.

The invention also includes an apparatus capable of carrying out the concentration processes, as will be described in the detailed discussion which follows.

BRIEF DESCRIPTION OF THE DRAWING

FIG. 1 is a schematic diagram of the process of the invention.

DESCRIPTION OF THE PREFERRED EMBODIMENTS

Deicing Fluids

Typically, deicing fluids used for aircraft contain ethylene glycol or propylene glycol (referred to herein generically as "glycols") and thus they are similar in concentration to ethylene glycol solutions used in automotive cooling systems. However, they are used under different conditions and do not employ the same additives which are required for cooling systems. Instead, they will usually include proprietary additives which are used to meet the specifications for such fluids. The deicing fluids are sprayed onto aircraft or runways which have ice or snow on their surfaces and the fluid which runs off and is recovered will be much more dilute in most instances than the concentrated form in which they are applied. Also, they will acquire contaminants from contact with the aircraft and the runways on which it rests. A typical analysis of a diluted deicing fluid which is reclaimed by means of the invention is as follows:

8 wt. % ethylene glycol 0.5 wt. % diethylene glycol 0.2 wt. % methanol remainder water with additives and contaminants.

Such diluted solutions must be recovered to avoid environmental contamination by the glycols. It will be evident that the glycols must be concentrated and the additives contaminants must also be separated. The process and apparatus of the invention is able to reprocess deicing fluids to meet these requirements. The equipment also may be used to reclaim spent coolant from automotive cooling systems.

Membrane Concentration of Dilute Glycols

Two types of membranes may be found in apparatus according to the invention. The first type may be called an evaporative membrane, that is it is only capable of passing water vapor and not liquid water. Such membranes are hydrophobic and have pores between about 0.01–2.0 μm in size so that liquid water is prevented from passing through the membrane by surface tension forces until a pressure is applied which overcomes the surface tension of the water. This pressure is termed the "breakthrough pressure." Evaporative membranes have been suggested for use in desalination of water, Anderson et al. Desalination, 56 (1985) 345–354, Elsevier Science Publishers, B.V. and in U.S. Pat. No. 4,545,862. The membranes in the process and apparatus of the invention are operated at pressures below the breakthrough pressure, which in this application is about 40 psig (377 kPa) for the preferred PTFE membrane which has pores in the range of 0.1–1.0 μm.

The temperature of the glycol solution will be below boiling but high enough to create a substantial driving force for passage of the water vapor through the membrane. Preferably, a temperature in the range of about 40° C. to 80° C. will be used in order to optimize the size of the membrane and the heat required to make the separation. The conditions on the opposite face of the membrane will be established to provide a driving force for the separation also, that is the vapor pressure of water at the opposite face will be below that on the glycol solution side. This may be established by control of the temperature or by dilution with a sweep gas if that method is used to remove the water. Typical temperatures on the opposite face of the membrane will be about 5° C. to 40° C.

Membranes may be made of various polymeric materials such as PTFE, polypropylene, and polyvinylidene chloride, preferably, PTFE since it is inert to the glycols and the contaminants and is highly hydrophobic. Other membranes which may be used include porous polypropylene hollow fibers or flat sheet membranes. The membranes are usually prepared by dry casting or solvent casting followed by cold or hot drawing and are commercially available for use as ultrafiltration or microfiltration membranes. The requirements for such membranes are discussed in U.S. Pat. No. 4,545,862 where it is disclosed that suitable membranes include those disclosed in U.S. Pat. No. 3,953,566. Generally, such membranes are said to be about 0.001 to 0.005 inches thick (0.0254–0.127 mm) and to have a void fraction of about 80–90%.

The second membrane used in an alternative embodiment is a reverse osmosis membrane. These are familiar to those skilled in the art of desalination of brackish water where they are used to separate dissolved salts while passing water through them by the application of substantial pressure to overcome the osmotic pressure difference between saline water and pure water. These membranes are made of many materials and have pores below about 0.001 μm. A typical membrane is made by the interfacial reaction of a polyamine with an acyl chloride on the surface of a porous support to produce a polyamide membrane, e.g., reacting m-phenylene diamine with trimesoyl chloride on a porous polysulfone support. These membranes are capable of making a separation between ethylene glycol and water to concentrate the ethylene glycol before the solution is passed over the evaporative membrane for removing additional water. Typically, the ethylene glycol solution will be concentrated to about 15–20 wt. % by the reverse osmosis membrane and then passed to the evaporative membrane for further concentration to about 50 to 80 wt. %.

Processing Conditions

The conditions used in the process of the invention have been generally described above. More particularly, the operating conditions for the process may be adjusted within these parameters so that the process is most efficiently carried out. Typically, the dilute ethylene glycol solution will be between 1 and 10 wt. % glycol, more preferably 3 and 8 wt. %, but the concentration will not ordinarily be easily controlled in view of the conditions under which the deicing fluid is used. The objective is to concentrate the solution to at least 20 wt. % glycol, preferably at least 50 wt. % glycol. Although there is no need to approach pure ethylene glycol in most instances, the method may be used to produce ethylene glycol solutions up to about 80 wt. %.

The solution should be first filtered through a relatively coarse filter able to remove particles above 5 microns which would could interfere with the operation of the evaporative membrane and the reverse osmosis membrane if used. Ultrafiltration may be used to polish the solution and to remove polymeric additives if present. The reverse osmosis membrane would be operated at ambient temperatures, that is about 20° C., but the pressure required to make the separation of water from the solution would be about 700–1,000 psig (4,928–6,996 kPa). The pressure will affect the rate at which the water passes through the membrane, but it also has an effect on the separation since the pressure differential across the membrane tends to compress the membrane and thus can improve the discrimination between the water and ethylene glycol molecules while decreasing the flow rate of water. The actual pressure selected for any practical application will be determined by the membrane characteristics and the costs for providing the pressure and the equipment design as will be understood by those skilled in the art.

The evaporative membrane will be operated with a relatively low pressure to avoid water breakthrough and also there is no advantage to be gained by using relatively high pressures as with the reverse osmosis membrane. Consequently, the pressure would be expected to be found between about 5 psig (136 kPa abs.) and 25 psig (274 kPa abs.). The temperature will be below boiling but high enough to provide a substantial vapor pressure, preferably about 40° C. to about 80° C. The temperature on the opposite face of the membrane will be lower, typically about 5° C. to 40° C., depending on the ability of the equipment to reject the heat of condensation. If, for example, a stream of air is passed over the opposite face of the membrane, the temperature is likely to be ambient, although the volume of air required would be affected by its temperature. On the other hand, if the water vapor is condensed into a stream of recirculating water, it will be necessary to remove the heat of condensation, which may require heat exchange with ambient air or water so that the temperature available for the circulating stream will be determined by the need for such heat exchange.

Description of the Apparatus

The FIGURE illustrates the two alternative embodiments of the process of the invention and typical apparatus for carrying it out. The dilute deicing fluid may be received at rates of about 2,000 to 10,000 gallons per day in a typical busy airport during bad weather and would be stored in a tank (not shown) before concentration. The solution will contain about 1 to 10 wt. % glycol plus contaminants in water. The solid particles larger than about 5 μm will be removed by a relatively coarse filter 10. After this preliminary filtration, the solution preferably will be passed through a secondary ultrafiltration unit 12 which is capable of removing certain polymeric additives which are used to make the deicing fluid thixotropic. Ultrafiltration will remove particles between 0.001 and 5 μm. The filtered solution is then concentrated by the membrane evaporation unit 14, either alone or in sequence with a preliminary concentration using the reverse osmosis unit 16. If the reverse osmosis unit is included, the solution will be concentrated to about 20 wt. % glycol before being passed to the membrane evaporation unit. The liquid water which permeated the reverse osmosis membrane will contain a small amount of glycol since the separation is not perfect. This residual glycol may require cleanup by such means as adsorption or as shown in the FIGURE a biological treatment unit 18 which uses organisms selected to convert glycols into carbon dioxide and water. The membrane evaporator unit receives the concentrated solution and operating at about 5 psig (136 kPa abs.) and 50°–70° C., concentrates the solution to about 50 wt. % glycol. In the embodiment shown the water vapor which passes through the membrane is removed by a continuous stream of water 15.

EXAMPLE 1

Membrane Distillation

A 25–60 μm thick PTFE membrane having nominal 0.2 μm pores supported on a 0.005 in (127 μm) thick polypropylene screen (Gelman Sciences TF) was tested for its ability to separate water from spent deicing fluid. The membrane in flat sheet form was placed in a membrane cell which provided 0.29 ft$^2$ (0.027 m$^2$) of surface area for separation. Spent deicing fluid containing 8.0 wt. ethylene glycol, about 0.5 wt. % diethylene glycol, and about 0.2 wt. % methanol in water was continually circulated across the surface of the membrane at a rate of 780 mL/min with the pressure at 8.0 psig (1565 kPa) and the temperature 55° C. The opposite face of the membrane was continually contacted with a recirculating stream of water at a rate of 680 mL/min and a pressure of 5.0 psig (136 kPa) and the temperature from 24° to 28° C. The membrane water flux was found to be 3.0 gallon/ft$^2$/day (GFD) (122 liter/m$^2$/day). The ethylene glycol concentration in the permeated stream was found to be less than 0.1 wt. %, indicating an effective rejection of glycol.

EXAMPLE 2

Membrane Distillation

A 400 μm thick polypropylene tubular membrane having nominal 0.2 μm pores was tested for its ability to separate water from spent deicing fluid. The membrane (Enka America) was disposed as a group of 1.8 mm (I.D.) porous tubes in a shell and tube configuration to provide 0.6 ft$^2$ (0.056 m$^2$) of surface for separation. Spent deicing fluid containing 8 wt. % ethylene glycol, 0.5 wt. % diethylene glycol, and 0.2 wt. % methanol in water was continually circulated through the inside of the tubes at a rate of 480 mL/min. with the pressure of 5 psig (136 kPa abs.). The outside surfaces of the tubes was continually contacted with a recirculating stream of water at a rate of 270 mL/min and a pressure of 1–2 psig (108–216 kPa abs.). The temperature of the recirculating cool water was increased from 13.9° C. to 30.5° C. to change the driving force for water evaporation. It was found that the volume of water passing through the membrane was linear with time and that the volume decreased as the temperature increased (i.e. the driving force decreased). The results are shown in the following table:

TABLE A

| Deicing Fluid Temp. °C. | Water Temp, °C. | Water Flux L/m$^2$/day |
| --- | --- | --- |
| 52.1 | 13.9 | 59.5 |
| 53.6 | 19.1 | 49.1 |
| 54 | 30.5 | 33.6 |

The ethylene glycol contained in the water permeate was found to be about 0.12–0.15 wt. %, indicating an effective rejection of the glycol.

EXAMPLE 3

Reverse Osmosis Concentration

The spent deicing fluid tested in Example 1 was passed over a reverse osmosis membrane obtained from AlliedSignal Fluid Systems designated TFCL-HP, a commercially available polyamide membrane on a polysulfone support. A 3 in$^2$ (19 cm$^2$) piece of membrane was tested using a fluid pressure of 800 psig (5,516 kPa gauge) and a temperature of 25° C. Initially, the membrane passed liquid at a rate of about 12–15 gallons/ft$^2$/day (4.3–5.3 L/m$^2$/day) but the flux decreased to about 8.5–10 gallons/ft$^2$/day (2.9–3.6 L/m$^2$/day) after 160 hours whereupon the membrane was washed with Filtrapure T.F. membrane cleansing agent (H.B. Fuller Co.) and the flux recovered to about 12–14 gallons/ft$^2$/day (4.3–5.0 L/m$^2$/day). The flux decreased again and after about 350 hours the washing procedure was repeated and the flux rate recovered as before. It was concluded that reverse osmosis would provide a satisfactory means of concentrating the dilute spent deicing fluid when washing was routinely carried out to maintain the flux.

The rejection of ethylene glycol was initially about 75% but it was found that the rejection increased with time until after about 380 hours of use the rejection of ethylene glycol was about 87%.

I claim:

1. A method of concentrating spent deicing fluid wherein said fluid is selected from the group consisting of ethylene glycol and propylene glycol in aqueous solutions by removing water therefrom consisting essentially of:
   (a) passing said aqueous glycol solution over one face of a hydrophobic porous membrane having 0.01 to 2.0 μm pores at a pressure below the breakthrough pressure of liquid water and at a temperature below the boiling point of said solution between about 40° C. and 80° C. and above the temperature on the opposite face of said membrane between about 5° C. and 40° C., whereby water vapor from said solution passes through the pores of said membrane to said opposite membrane face while rejecting liquid water and glycol and said aqueous glycol solution is concentrated by removing said water vapor;

(b) removing said water vapor of (a) passed through said membrane; and (c) recovering the concentrated aqueous glycol solution.

2. The method of claim 1 wherein said water vapor is condensed by a circulating stream of liquid.

3. The method of claim 2 wherein said circulating stream of liquid is condensed water vapor of (a).

4. The method of claim 1 wherein said water vapor is removed from said opposite face by a stream of a gas.

5. The method of claim 4 wherein said gas is air.

6. The method of claim 4 wherein said gas stream is cooled to condense and separate said water vapor.

7. The method of claim 1 wherein said hydrophobic porous membrane is PTFE having nominal 0.2 µm pores.

8. The method of claim 1 wherein said hydrophobic porous membrane is polypropylene having nominal 0.2 µm pores.

9. The method of claim 1 wherein said aqueous solution of (a) comprises 1 to 10 wt. % glycol.

10. The method of claim 1 wherein said concentrated aqueous solution of (c) is at least 20 wt. % glycol.

11. The method of claim 1 further comprising the step of concentrating said aqueous glycol solution before step (a) by passing said solution over a reverse osmosis membrane under reverse osmosis conditions and removing the water which permeates through said membrane.

12. The method of claim 11 wherein said reverse osmosis membrane is a polyamide formed on the surface of a porous support.

13. An apparatus for the concentration of spent deicing fluid wherein said fluid is selected from the group consisting of ethylene glycol and propylene glycol in an aqueous solution by removing water therefrom consisting essentially of:

(a) an evaporative membrane means in contact with said glycol solution for removing water as vapor from said solution wherein said membrane means has pores of about 0.01 to 2.0 µm and is capable of passing water vapor and rejecting liquid water and glycol;

(b) means for establishing a pressure of said solution below the breakthrough pressure of liquid water on a first face of said membrane means and a temperature between about 40° C. and 80° C. on said first face of said membrane means and between about 5° C. and 40° C. on the opposite face of said membrane to establish a vapor pressure differential across said membrane means;

(c) means for removing said water vapor of (a) pass through said membrane; and (d) means for recovering the concentrated aqueous glycol solution.

14. An apparatus of claim 13 wherein said evaporative membrane is a PTFE membrane having nominal 0.2 µm pores.

15. An apparatus of claim 13 further comprising a reverse osmosis means disposed to first concentrate said aqueous glycol solution before concentration in said evaporative membrane means.

16. An apparatus of claim 15 wherein said reverse osmosis means comprises a polyamide reverse osmosis membrane on a porous support.

* * * * *